United States Patent Office 3,458,448
Patented July 29, 1969

3,458,448
ISOCYANURATE-CONTAINING
POLYISOCYANATES
Perry A. Argabright, Vernon J. Sinkey, and Brian L.
Phillips, Littleton, Colo., assignors to Marathon
Oil Company, Findlay, Ohio, a corporation of Ohio
No Drawing. Filed Jan. 25, 1967, Ser. No. 611,588
Int. Cl. C09k 3/00; C08d 13/08
U.S. Cl. 252—182
10 Claims

ABSTRACT OF THE DISCLOSURE

The present invention comprises processes for the preparation of polyisocyanate compounds containing isocyanurate rings comprising the step of reacting an organic dichloride with a metal cyanate in the conjoint presence of a halide catalyst and an aprotic solvent.

---

The present invention also comprises new isocyanurate-containing isocyanate compositions. Both the new and conventional isocyanates produced by the processes of the present invention are useful for the wide variety of uses to which isocyanates are conventionally put, including particularly the manufacture of polyurethane polymers in the form of coatings, films, foams, etc.

Polyisocyanates, particularly tolylene diisocyanate (TDI) are widely used in the production of urethane polymers as coatings, films, and foams, and for other purposes. Urethane polymers offer advantages wherever superior resistance to abrasion, acids, alkalis and weather is required. A significant disadvantage of presently available urethane compositions has been their tendency to discolor and degrade when exposed to sun-light and the elements.

The present invention permits the production of new isocyanates in which the nitrogen of the isocyanate radical (—N=C=O) is not attached to an aromatic ring. It has been discovered that polymers derived from isocyanates having this special molecular characteristic are markedly less subject to degradation and discoloration than are the polymers produced from conventional isocyanates in which the nitrogen is attached to an aromatic ring. In addition, the present invention permits the production of polyisocyanates which automatically contain at least about 0.1 and preferably from 10 to about 75 mole percent (based on the total moles of nitrogen in the compositions) of isocyanurate groups which have been discovered to lend additional stability and resistance to degradation of finished polymers.

In addition to the superior properties of the finished polymers produced from the isocyanates of the present invention, the invention offers distinct economic advantages in that the production of these superior polyisocyanates is accomplished in a single step reaction which minimizes operating costs, required equipment and related capital investment.

In general, the invention involves the production of polyisocyanates through the reaction of an organic dichloride with a metal cyanate in the presence of a metal halide, preferably an iodide or bromide using an aprotic solvent as defined herein. The overall reaction may be generally summarized as follows:

$$Cl-R-Cl + M(NCO)_n \xrightarrow{M'Y_m} \left[ \begin{array}{c} O=\overset{|}{\underset{|}{N}}=O \\ -N \qquad N- \\ \overset{\|}{O} \end{array} \right]_p [-R-]_{2p+1}[NCO]_{p+2}$$

R=divalent alkyl or substituted divalent alkyl, for example:

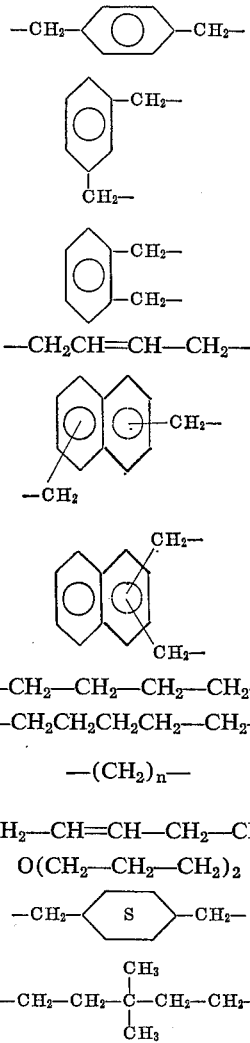

etc.

M=alkali or alkaline earth metal, for example Li, Na, K, Rb, Cs, Be, Mg, Ca, etc.,
n=oxidation number of metal,
M'=a metal, preferably an alkali or alkaline earth metal,
Y=a very reactive nucleophile, for example I or Br,
m=oxidation state of the metal M',
p may be varied from 0 to over 15, but will preferably be from 1 to about 6 in order to produce the desirable isocyanurate-containing polyisocyanates of the present invention. The value of p may be controlled by utilizing greater or lesser concentrations of the halide catalyst as discussed hereafter.

By aprotic solvents is meant compositions which are liquid under the conditions of the reaction, which have a high dielectric constant (greater than about 15 at 25 degrees C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to anions in solution in the reaction mixture. The aprotic solvent can be composed of a mixture of liquids so long as the over-all liquid compositions meet the above criteria. Preferred among the aprotic solvents are N-alkyl pyrrolidones, dialkyl formamides (e.g., N,N-dimethylformamide (DMF)), N,N-dimethylacetamide, acetonitrile, N-alkylpyrrolidones, hexaalkylphosphoramides, and tetraalkylureas, especially those in which the alkyl groups are methyl groups. The most preferred solvent for the reaction of the present invention is dimethyl formamide. Preferably from about 5 to about 100 and most preferably from about 10 to about 50 moles of the solvent will be present for each mole of dihalide starting material.

The ratio of NCO to chlorine in the dichloride is preferably from 0.8 to about 1.5 and most preferably from 1.00 to about 1.10.

As mentioned previously, the value of $p$ can be varied by varying the amount of catalyst employed in the reaction mixtures of the present invention. For example, at reflux in DMF, $p$ will average approximately 1 when the concentration of the halide catalyst is about 0.10 to 0.15 mole of halide in the catalyst per mole of chlorine in the dichloride. $p$ will generally be above about 2 when from about 0.01 to 0.05 mole of halide in the catalyst are present for each mole of chlorine in the dichloride. Different solvents and temperatures will somewhat change the average values of $p$, and intermediate values of catalyst concentration will give intermediate average values of $p$. For most polyisocyanates which are to be used in the production of urethane polymers an average value of $p$ of approximately 0.5 to about 2.5 will be preferred with values of from about 1.0 to about 2.0 being most preferred. Correspondingly, catalysts concentration of from 0.02 to about 0.25, and more preferably 0.05 to about 0.15 mole of halide in the catalyst per mole of chlorine in the dichloride will be used in producing isocyanates for urethane production.

For purposes of this invention, the dichloride is taken from the class of trans-Cl—CH$_2$—CH=CH—CH$_2$Cl

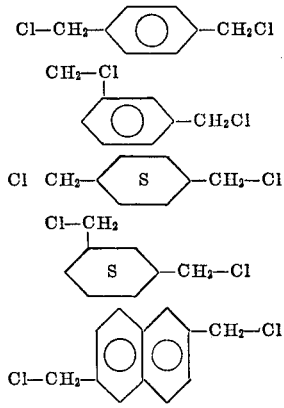

and the dichlorides of tetramethylene, pentamethylene, hexamethylene, heptamethylene, octamethylene, etc., or lower alkyl derivatives thereof, which are free from substituents which interfere with the reaction of the present invention.

trans-Cl—CH$_2$—CH=CH—CH$_2$—Cl

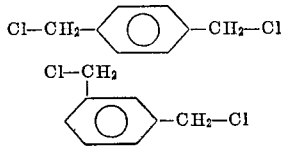

and the dichlorides of hexamethylene, and their substituted derivatives are preferred.

The reaction of the present invention is preferably conducted at a temperature of from about 25 to about 300° C. and most preferably at from 50 to about 150° C. Pressure is not critical and may be from below one atmosphere to over 10,000 p.s.i.g. In most cases, it will be preferable to conduct the reaction in the absence of air on a batch-type basis, although flow systems may be utilized. The most convenient apparatus will, in most cases, be a conventional tight-lid varnish cooker or similar reactor having a reflux condenser, provision for agitation, and the usual controls for temperature and pressure.

The actual products of the present invention will, in most cases, be mixtures of specific compounds which will vary in their molecular configurations somewhat as the value of $p$ is increased. For example, at $p$ equals 1, compositions having the following molecular configurations will predominate (with the sub groups being as previously defined):

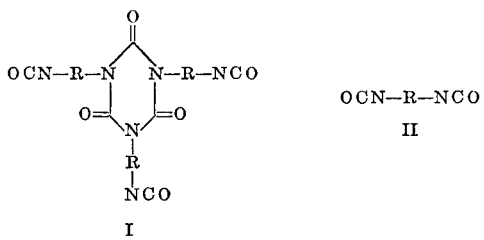

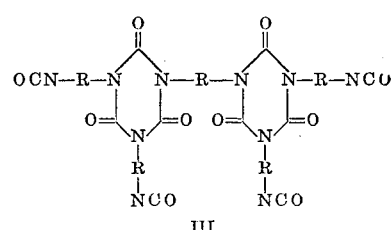

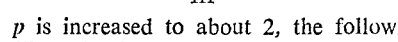

When $p$ is increased to about 2, the following compounds will predominate:
I, III and

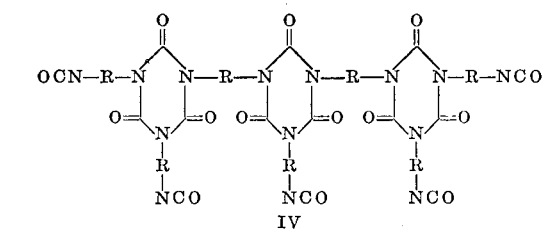

Even more complex compounds will predominate when $p$ equals 3 or above.

In general, commercial grades of starting materials will be satisfactory for the reactions of the present invention, but anhydrous starting materials (containing less than about 1% and preferably less than about 0.5% by weight of water) will be preferred.

The invention will be better understood by reference to the examples which follow. These are intended to be illustrative of the invention and should not be construed as limiting it in any manner. It should be understood that substituents and incorporations in the above mentioned starting materials can be made without departing from the spirit of the invention. The invention is susceptible to a wide variety of variations and modifications which will become obvious to those skilled in the art upon a reading of the present application, and all such obvious variations and modifications are to be taken as being within the scope of the claims appended hereto.

EXAMPLE I

A mixture of 26.36 g. (0.40 mole) NaNCO, 11.9 g. (0.1 mole) KBr, and 200 ml. DMF (purified via distillation from CaH$_2$) is brought to reflux in a 500 ml. flask equipped with a reflux condenser, stirrer, thermometer, and means for maintaining a N$_2$ atmosphere. 35.0 g. (0.2 mole) p-xylylene dichloride is added and the reaction is held at 145–150° C. for 20 minutes. The reaction is then cooled very rapidly and the reaction mixture filtered cold (10° C.). The DMF is flashed off under vacuum at 60° C. and the residue mixed with benzene. The undissolved salts are filtered off, and the benzene is removed from the filtrate to yield 39 g. of a clear yellow oil. Both infrared and NMR spectra of the oil confirm the presence of isocyanurate and isocyanate groups. Quantitative analysis for the latter indicates 6.0 meq. free NCO/g.

EXAMPLES II–VII

The following examples are set forth to illustrate the effect catalyst (bromide) concentration on the isocyanate content of the resulting products. Reaction conditions and reactants are identical to those used in Example I.

| Example | Catalyst [1] Percent KBr | Percent NaBr | Free NCO (meq./g.)[2] |
|---|---|---|---|
| II | [3] 15 | | 5.9 |
| III | 10 | | 4.9 |
| IV | 5 | | [4] 4.1 |
| V | 1 | | [5] Insoluble product |
| VI | 0 | | [5] Insoluble product |
| VII | | 15 | 6.8 |

[1] Based on organic chlorine.
[2] Determined by infrared analysis.
[3] Solubility limit of KBr corresponds to catalyst level between 10–15 mole percent.
[4] Equivalent.
[5] These results demonstrate the need for the catalyst of the present invention.

EXAMPLE VIII

A mixture of 2.98 g. KBr (0.025 mole), 13.0 g. NaNCO (0.20 mole) and 17.5 g. p-xylylene dichloride (0.10 mole) in 250 ml. DMF was heated at 100 degrees C. for 2.5 hrs. with good stirring. The product (light yellow oil) was isolated in the same manner as described in Example I. A quantitative infrared analysis shows the product to contain 4.2 meq./g. of free isocyanate groups.

EXAMPLE IX

A mixture of 6.64 g. KI (0.04 mole), 26.0 g. NaNCO (0.40 mole) and 35.0 g. p-xylylene dichloride (0.20 mole) in 750 ml. of DMF was heated at 100 degrees C. for 1.5 hours with good stirring. The yellow oil (isolated as in Example I) contains 4.7 meq./g. of free NCO groups (infrared analysis).

EXAMPLE X

A one-shot polyester flexible foam can be prepared from the polyisocyanate of Example VII according to the following formulation:

One-shot foam formulation (parts by weight)

| | |
|---|---|
| Multron R–18 | 100 |
| N-methylmorpholine | 2.5 |
| Water | 2.5 |
| Stannous octoate | 0.4 |
| Wittco Fomrez 77–86 | 3.0 |
| Polyisocyanate [1] | 62.6 |

[1] From Example VII. Isocyanate content=6.77 mg./g.

The polyester, stannous octoate, and Wittco 77–86 are mixed in a container. The water and N-methylmorpholine are mixed, added to the container, and stirred in. The polyisocyanate is stirred in and the foam is allowed to rise and set for ½ hour. Baking at 80° C. for one hour yields a white flexible foam, density 5.7 lb./ft.³.

EXAMPLE XI

A flame-retardant rigid foam is prepared as follows:

One-shot, flame-retardant, rigid foam

Component A:

| | |
|---|---|
| Thanol R–350–X (Jefferson Chem.) | 100 |
| Fluorotrichloromethane | 24 |
| Silicone oil (Union Carbide L–45) | 2.0 |
| N-methylmorpholine | 0.2 |

Component B:

| | |
|---|---|
| Polyisocyanate (from Example II, NCO content 5.9 meq./g.) | 145 |

Component B is weighed into a mixing container and component A is added. The mixture is stirred for a minute and then poured into a mold to rise. The foam is aged 24 hours at room temperature and then demolded. The density of the product is 9.2 lb./ft.³.

What is claimed is:

1. A process for the preparation of polyisocyanate compounds containing isocyanurate rings comprising the step of reacting an organic dichloride selected from the class consisting of:

trans-Cl—CH$_2$—CH=CH—CH$_2$Cl

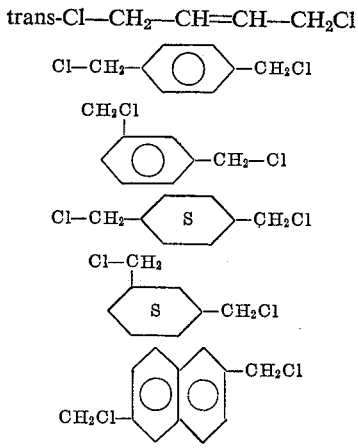

and the dichlorides of tetramethylene, pentamethylene, hexamethylene, heptamethylene, octamethylene, or lower alkyl derivatives thereof, which are free from substituents which interfere with the reaction of the present invention, with a cyanate of a metal selected from the group consisting of Li, Na, K, Rb, Cs, Ca, Mg, and Be, in the conjoint presence of a catalyst selected from the group consisting of alkali metal bromide or iodide or alkaline earth metal bromide or iodide together with an aprotic solvent which is liquid under the conditions of the reaction, which has a dielectric constant greater than about 15 at 25° C., which is dipolar so that one part of the molecule has a more positive electrical charge relative to the other parts of the molecule causing the molecule to act as a dipole, which is sufficiently inert not to enter into deleterious side reactions to a significant degree under reaction conditions, and which does not possess hydrogen atoms capable of hydrogen bonding with or transferring to ions in solution in the reaction mixture, or mixtures of such aprotic solvents, wherein the reaction is conducted at a temperature of from about 25 to about 300° C., wherein the mole ratio of metal cyanate to the chloride in the organic dichloride is from about 0.8 to about 1.5, and wherein about 5 to 100 moles of solvent are present for each mole of dihalide starting material.

2. The process of claim 1 wherein the catalyst is selected from the group consisting of sodium iodide, sodium bromide, potassium iodide, potassium bromide and mixtures thereof.

3. The process of claim 1 wherein the aprotic solvent is selected from the group consisting of N-alkyl pyrrolidones, dialkyl formamides, N,N-dimethylacetamide, acetonitrile, N-alkyl-pyrrolidone, hexaalkylphosphoramide, and tetraalkylurea.

4. The process of claim 3 in which the aprotic solvent comprises a major portion of N,N-dimethyl formamide.

5. The process of claim 3 wherein there are present from about 10 to about 100 moles of aprotic solvent for each mole of dihalide starting material.

6. Mixtures of organic polyisocyanates containing from about 10 to about 75 mole percent of isocyanurate groups based on the total moles of nitrogen in the mixture and having a free isocyanate content of at least 0.77 equivalent of NCO groups per equivalent of R and having the following formula:

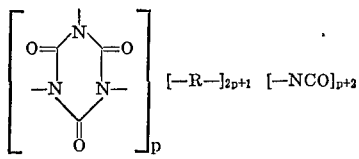 [—R—]₂ₚ₊₁ [—NCO]ₚ₊₂ where $p$ has an average value of from 0.5 to about 15, R is a divalent alkyl or substituted alkyl group selected from the group consisting of

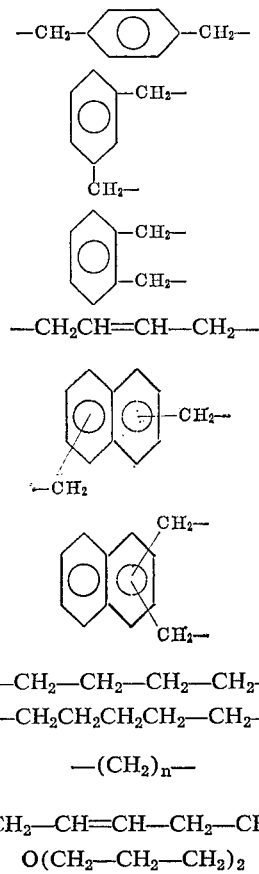

—CH₂—CH₂—CH₂—CH₂—

—CH₂CH₂CH₂CH₂—CH₂— or

—(CH₂)ₙ— where $n=3$–20

—CH₂—CH=CH—CH₂—CH₂—

O(CH₂—CH₂—CH₂)₂

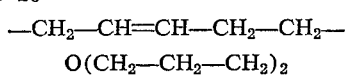

$$-CH_2-CH_2-\underset{\underset{CH_3}{|}}{\overset{\overset{CH_3}{|}}{C}}-CH_2-CH_2-$$

tetramethylene, pentamethylene, hexamethylene, heptamethylene, octamethylene, or lower alkyl derivatives of the foregoing and wherein there are no nitrogen to nitrogen bonds.

7. The process of claim 2 wherein the concentration of the halide catalyst is from about 0.1 to about 0.25 moles of halide in the catalyst per mole of chlorine in the dichloride.

8. The process of claim 2 wherein the concentration of the halide catalyst is from about 0.05 to about 0.15 moles of halide in the catalyst per mole of chlorine in the dichloride.

9. A process according to claim 1 for the preparation of an oil, liquid at room temperature, consisting essentially of mixtures of organic polyisocyanates having a free isocyanate content of at least 4.1 milliequivalents of NCO groups/gram consisting essentially of reacting said organic dichloride with sodium cyanate or potassium cyanate in the conjoint presence of dimethylformamide together with a catalyst selected from the group consisting of sodium bromide, sodium iodide, potassium bromide, or potassium iodide at a temperature of from about 50 to about 150° C. wherein the ratio of metal cyanate to chlorine in the dichloride is from 1.00 to about 1.10 and wherein from about 10 to about 50 moles of dimethylformamide are present for each mole of dichloride starting material.

10. The process of claim 9 wherein the organic dichloride comprises p-xylylene dichloride.

References Cited
UNITED STATES PATENTS

| | | |
|---|---|---|
| 2,866,801 | 12/1958 | Himel et al. |
| 2,866,803 | 12/1958 | De Pree. |
| 3,017,420 | 1/1962 | Schaeffer. |

LEON D. ROSDOL, Primary Examiner

I. GLUCK, Assistant Examiner

U.S. Cl. X.R.

260—2.5, 77.5, 248, 453

IN THE UNITED STATES PATENT OFFICE

CERTIFICATE OF CORRECTION

Patent No. 3,458,448                      Dated July 29, 1969

Perry A. Argabright, et al

It is certified that error appears in the above-identified patent and that said Letters Patent are hereby corrected as shown below:

In the patent, Col. 5, Footnote 4 to Examples II-VII should read

Equivalent to 0.77 equivalents $NCO^-$ per equivalent of -R-.

SIGNED AND
SEALED
JUN 16 1970

(SEAL)
Attest:

Edward M. Fletcher, Jr.
Attesting Officer

WILLIAM E. SCHUYLER, JR.
Commissioner of Patents

IN THE UNITED STATES PATENT OFFICE

CERTIFICATE OF CORRECTION

Patent No. 3,458,448            Dated July 29, 1969

Perry A. Argabright, et al

It is certified that error appears in the above-identified patent and that said Letters Patent are hereby corrected as shown below:

In the patent, Col. 5, Footnote 4 to Examples II-VII should read

Equivalent to 0.77 equivalents $NCO^-$ per equivalent of -R-.

SIGNED AND
SEALED
JUN 16 1970

(SEAL)
Attest:

Edward M. Fletcher, Jr.
Attesting Officer

WILLIAM E. SCHUYLER, JR.
Commissioner of Patents